UNITED STATES PATENT OFFICE.

CARL DREYMANN, OF BALTIMORE, MARYLAND.

PREPARING OILS AND FATS FOR HYDROGENATION.

1,228,888.  Specification of Letters Patent.  Patented June 5, 1917.

No Drawing.  Application filed December 6, 1915. Serial No. 65,303.

*To all whom it may concern:*

Be it known that I, CARL DREYMANN, a subject of the German Empire, residing at Baltimore, in the State of Maryland, have invented certain new and useful Improvements in Preparing Oils and Fats for Hydrogenation, of which the following is a full, clear, and exact description.

It is well understood at the present time that in order to "hydrogenate" oils economically they should be neutral or substantially so; the presence of so much as two per cent. free fatty acid or acids being enough to greatly impair the function of the catalytic agent used in the hydrogenation. For this reason the practice is to first carefully neutralize the oil by means of caustic soda. If the percentage of free fatty acids exceeds five per cent., or thereabout, the removal of the fatty acids by neutralization with caustic soda is difficult and is attended by considerable loss and expense. In consequence only first class neutral oils are being used for hydrogenation.

I have accordingly been led to devise my present invention, which has for its chief object to provide a simple and economical method of preparing for hydrogenation, oils and fats containing as much as twenty per cent., or even more, free fatty acid. To this end the invention consists in the novel process and steps hereinafter described.

In accordance with my invention I prepare the oil or fat for hydrogenation by converting the free fatty acid into a neutral ester; the conversion being effected preferably by heating with alcohol, an ester which can be hydrogenated as readily as pure oil (glycerid).

In applying my invention in the preferred manner to an oil containing as much as 20% free fatty acid, I take, say, one hundred parts of the oil, five to eight parts absolute alcohol (ethyl), a sufficient amount of hydrochloric acid to act as a catalytic agent, and some calcium chlorid as a dehydrating agent. The proportions of the last two ingredients may vary, but I find that three parts HCl and twenty parts $CaCl_2$ usually give good results. The mixture described is heated to a temperature around 90° C. for about three hours,—or for a longer or shorter time, according as the temperature is lower or higher,—after which the product is washed with water.

The oil or fat so treated will be found to have a low content of free fatty acid, in general less than 3%, an amount that can be removed without difficulty by neutralization with caustic soda in any convenient way.

In some cases, especially where the oil contains 30% or more free fatty acid, it is advantageous to first remove the glycerin, preferably all of it. This separation can be effected in any convenient way, as for example, by the Twitchell process. The fatty acids (as oleic and stearic acids) thus obtained can then be converted into esters by treatment with alcohol for about three hours at 90° C., using rather more alcohol than when the proportion of fatty acid or acids is less. For instance, with a hundred parts of the fatty acids I would use, say, twenty parts ethyl alcohol; and three parts hydrochloric acid and twenty parts calcium chlorid. The ester thus produced contains only from 1% to 3% free fatty acid, which, after washing with water, can be easily removed by neutralization with caustic soda in the well known way. The glycerin of course is a valuable by-product.

The process is suitable for oils as well as fats, and is expected to find its chief utility in treating inferior products, such as cotton oil soapstock and garbage grease. The neutral ester produced can of course be used for other purposes than hydrogenation.

It is to be understood that the invention is not limited to the exact procedure herein described, but can be practised in other ways without departure from its spirit.

I claim:

1. In the treatment of oils and fats to prepare the same for hydrogenation, the process comprising converting the free fatty acids of the oil or fat into neutral esters by heating with alcohol, a catalytic agent, and a dehydrating agent, leaving in the oil or fat the neutral esters so produced and then neutralizing any remaining free fatty acid or acids.

2. In the treatment of oils and fats to prepare the same for hydrogenation, the process comprising separating the glycerin from the fatty acids, converting the fatty acids into neutral esters, leaving in the oil or fat the neutral esters so produced, and then neutralizing any remaining free fatty acid or acids.

In testimony whereof I hereunto affix my signature.

CARL DREYMANN.